WOVEN CLOTH OF FIBROUS CARBON OR GRAPHITE

INVENTORS
DEMETRIOS V. LOUZOS
ROBERT A. POWERS
WILLIAM G. DARLAND, JR.

BY *John F. Hohmann*

ATTORNEY

DIAPHRAGM ELECTRODE PLASTIC BONDED CARBON OR GRAPHITE PARTICLES

FILLING PLUG ELECTRODE PLASTIC BONDED CARBON OR GRAPHITE PARTICLES

INVENTORS
DEMETRIOS V. LOUZOS
ROBERT A. POWERS
WILLIAM G. DARLAND, JR.

ATTORNEY

United States Patent Office 3,214,647
Patented Oct. 26, 1965

3,214,647
INERT ELECTRODES FOR ELECTROCHEMICAL DEVICES
Demetrios V. Louzos, Rocky River, Robert A. Powers, Lakewood, and William G. Darland, Jr., Parma, Ohio, assignors to Union Carbide Corporation, a corporation of New York
Filed Jan. 24, 1961, Ser. No. 84,606
3 Claims. (Cl. 317—230)

This invention relates to electrodes for electrochemical devices.

A family of electrochemical devices in which a number of different effects are achieved by the movement of ions in solution has recently attracted favorable attention. These devices have come to be known as "solions." Typical solions are described in detail in the literature: Journal of the Electrochemical Society, vol. 104, No. 12, December 1957; Yale Scientific Magazine, vol. XXXII, No. 5, February 1958; Electronics Products Engineering Bulletin No. 1, published November 1957 by National Carbon Company, 30 East 42nd Street, New York 17, New York; and U.S. Patent No. 2,890,414, issued to Earl S. Snavely, Jr., on June 9, 1959.

The basic principle upon which solions function is the electrolytic transfer of at least one chemical species in a reversible redox system. This transfer of species is made use of in solions to achieve a variety of different measurements. A solion device briefly comprises a unit of two compartments containing an electrolyte solution of a redox system which compartments are connected through an electrolytically conductive path. Electrodes are provided in each compartment which make contact with the electrolyte solution. The device is highly sensitive and it is extremely important that the electrolyte solution be free from impurities which might affect the stability of the device.

Heretofore, platinum electrodes have been utilized in solions, but their cost is high. Moreover, it has been found that platinum has a tendency to go into solution in certain electrolytes commonly employed for solions. Generally, the amount of platinum which goes into solution in the electrolyte is small but is sufficient to cause erratic behavior of the device. Carbon and graphite electrodes have been found to possess the necessary inertness for use in solions and have been utilized, but they also suffer from a disadvantage in that they are extremely fragile and consequently hard to handle, and are subject to breakage.

It is therefore the principal object of the invention to provide electrodes composed of carbon and graphite for use in solions, which electrodes are free from the disadvantages of electrodes heretofore used.

The invention will be described with reference to the accompanying drawings, in which.

The invention comprises a solion provided with electrodes composed of a fabric of a material selected from the group consisting of carbon and graphite and mixtures thereof.

More specifically, electrodes which are utilized in accordance with the invention are composed of a flexible fabric, the individual fibers of which are composed of carbon or graphite as well as mixtures thereof. Such electrodes may be made, for instance, of woven cloth of carbon or graphite fibers. Fibrous carbon or graphite is a recently developed fiber which has attracted considerable attention. It is produced from organic fibers such as, for example, natural cellulosic fibers and fibers of viscose rayon and saponified acetates. The organic fiber is heated to temperatures above at least 800° C. whereby to convert the fibers to carbon or graphite or mixtures thereof. Electrodes may also be utilized which are composed of plastic bonded carbon or graphite particles. The plastic material of which the electrodes may be made is characterized in that it is highly inert to the electrolyte solution of a solion, monochlorofluoroethylene and polyethylene being excellent examples. The electrodes may be made from a liquid impervious sheet prepared, for example, by molding a mixture of finely divided carbon black and a resin polymer, for example, monochlorofluoroethylene, at high temperatures and pressures.

While electrodes so utilized according to the invention possess all the highly desirable properties of carbon and graphite electrodes heretofore used in solion devices, they in addition possess certain other characteristics and properties which are outstanding. Notably, electrodes embodying the invention possess high strength and are flexible and pliable. They possess a good electrical conductivity and have a high effective surface area. Of outstanding utility, because they are flexible, they may be embodied in a solion in a variety of shapes and forms, and their connection to external electrical circuitry may be expediently achieved in a number of ways.

Figure 1:
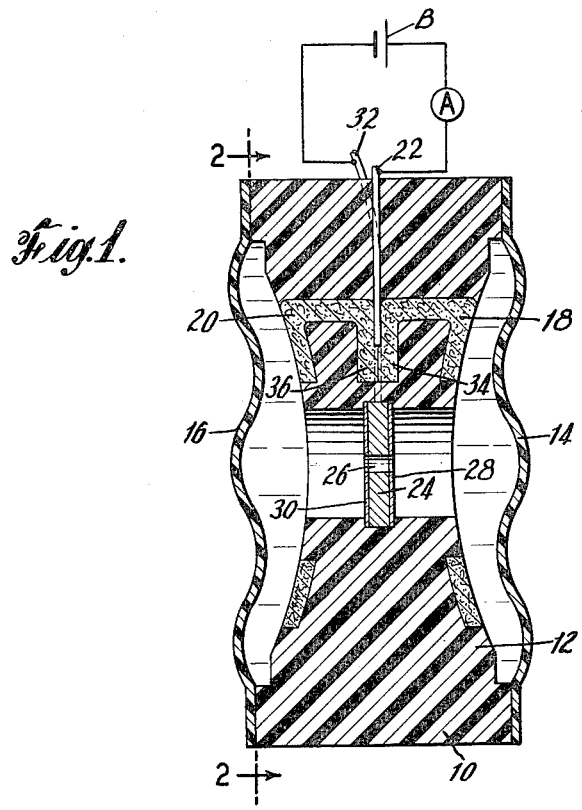
FIG. 1 is a vertical section of a typical solion provided with electrodes embodying the invention.
Figure 2:
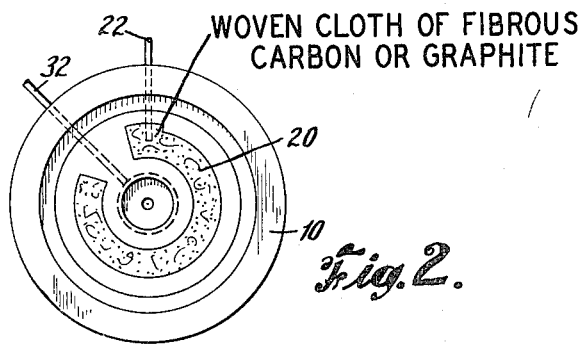
FIG. 2 is a view taken along the lines 2—2 of FIG. 1.

Referring now to the drawings, a typical solion provided with electrodes embodying the invention is shown in FIG. 1. The device illustrated is referred to as a "log detector." It is logarithmically responsive to acoustic pressure, producing a measurable electrical current. It comprises a housing 10 divided into two compartments by an apertured partition 12, each of the compartments having as one wall thereof one of a pair of flexible diaphragms 14, 16. A pair of woven cloth electrodes 18, 20 of carbon or graphite fibers are provided, one of each of which is embedded in the side wall of the partition 12 within each compartment. The electrodes 18, 20 have a somewhat annulus configuration as shown in FIG. 2, and are connected to a biasing circuit including a biasing battery B and an ammeter A through a common terminal 22, and constitute anodes for the device. A detecting electrode 24 suitably of platinum having a tiny orifice 26 at its center is mounted in the aperture of the partition 12 and is insulated except at the orifice by a thin layer 28, 30 of soft glass, for example, on each of its sides, access between the two compartments being solely through the tiny orifice 26. The detecting electrode 24 is connected to the biasing circuit through a terminal 32 and is made the cathode of the device. The two compartments are filled with a liquid electrolyte of a reversible redox system such as potassium iodide-iodine. When the device is properly biased and a pressure, such as an acoustical pressure, is applied to either of the diaphragms 14, 16, liquid tends to flow through the tiny orifice 26 from one compartment to the other of the detector. This causes a change in the flow of current passing through the biasing circuit which is measured by the ammeter A and recorded.

The log detector described may be constructed in several different ways. A preferred manner, however, of constructing a log detector may be illustrated as follows: A pair of molded plastic discs, each constituting half of the detector housing and having an aperture at their center, are preformed. A woven cloth electrode 18, 20 is then pressed into the side wall of each disc. The cloth electrodes 18, 20 are each provided with tabs 34, 36 which tabs are folded through a notch provided in the outer edge of each disc and similarly pressed into the back-side of the discs. The discs are then placed with their back-sides together and the tabs 34, 36 aligned so as to adjoin each other, and a terminal 22 is then placed in contact between the tabs 34, 36. A detecting electrode 24 having secured to it a terminal 32 is positioned within the apertures of the discs, and the discs are then molded together as a composite unit. During the molding operation, the plastic material of which the discs are made flows into and seals off the notches provided in the discs and all junctions between electrodes and their terminals. Flexible diaphragms also of plastic are then attached to the housing.

The plastic material of which both the housing and flexible diaphragms are made should be inert to the electrolyte solution used in the device. Depending upon the liquid used, nylon, polyethylene, polymethylmethacrylate or monochlorofluoroethylene plastics may be utilized. In the modification shown in FIG. 3, the plastic sheets of which the electrodes 18, 20 are made should be the same plastic material of which the housing of the detector is constructed. In this way, proper bonding between the electrodes and the housing is achieved.

Figure 4:
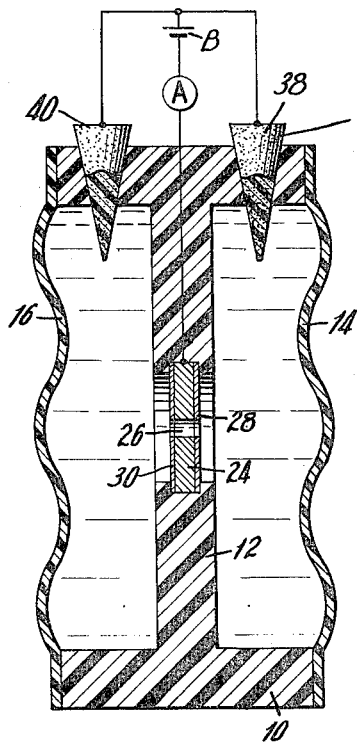
FIG. 4 is a similar view showing yet another embodiment.

As shown in FIGS. 4 and 5, the principles of the invention are applicable to a variety of constructions. For example, FIG. 4 shows a construction of a log detector in which the flexible diaphragms 14, 16 are utilized as electrodes for each compartment of the device. The diaphragms 14, 16 in this construction are composed of a plastic bonded sheet of carbon or graphite particles. FIG. 5 shows another construction in which filling plugs 38, 40 composed of plastic bonded particles of carbon or graphite are similarly used as electrodes for the compartments of a log detector.

A number of solion devices provided with electrodes embodying the invention have been constructed and tested over a wide range of conditions. The devices were easily assembled and their electrodes readily connected to external biasing circuitry. The tests showed that the devices remained extremely sensitive and stable throughout their operation, and were highly durable.

For example, a log detector was constructed and provided with anodes comprising a woven graphite cloth as shown in FIG. 1. The woven cloth anodes were made from organic rayon fibers graphitized at high temperatures. The log detector was filled with a solution of a potassium iodide-iodine redox electrolyte of the following composition: 2.0 N KI+0.17 N $I_2$+0.01% disodium salt of ethylenediamine tetraacetic acid. The log detector was tested continuously, at a temperature of about 90° F. at an acoustic pressure of 250 dynes per square centimeter root mean square. The bias voltage was maintained at 0.9 volt. The test lasted for seventeen days. The log detector showed a stable performance throughout the test.

Besides the iodide-iodine redox system mentioned above, the electrolyte solution of a solion may consist of a number of other systems, ferrocyanide-ferriccyanide and cerous-ceric systems, for example.

It will be understood that although electrodes embodying the invention have been illustrated herein as being used in the construction of a log detector, they may be utilized in a great number of other solion devices such as linear detectors, product detectors and integrators, and their use in such devices is intended to be within the scope of the invention.

We claim:
1. In a solution device comprising a body divided into two compartments, each of said compartments containing an electrolyte solution of a reversible redox system, said compartments being connected through an electrolytically conductive path, and an electrode within each of said compartments in contact with said electrolyte solution; the improvement in said electrode of said compartments in which said electrode is composed of a flexible fabric, the individual fibers of which are composed of a material selected from the group consisting of carbon, graphite and mixtures thereof.

2. In a solion detector comprising a body divided into two compartments by an apertured partition, each of said compartments having as one wall thereof one of a pair of flexible diaphragms, an electrolyte solution of a reversible redox system in said compartments, a detecting electrode mounted in the aperture of said partition and an electrode within each of said compartments in contact with said electrolyte solution; the improvement in said electrode of said compartments in which said electrode is one of said pair of flexible diaphragms and in which said flexible diaphragms are composed of particles of a conductive material bonded together by a thermoplastic resin into a coherent body, said conductive material of which said particles are composed being selected from the group consisting of carbon, graphite and mixtures thereof.

3. In a solion detector comprising a body divided into two compartments by an apertured partition, each of said compartments having as one wall thereof one of a pair of flexible diaphragms, an electrolyte solution of a reversible redox system in said compartments, a detecting electrode mounted in the aperture of said partition and an electrode within each of said compartments in contact with said electrolyte solution; the improvement in said electrode of said compartments in which said electrode is one of a pair of filling plugs mounted within said body and extending into said compartments and in which said filling plugs are composed of particles of a conductive material bonded together by a thermoplastic resin into a coherent body, said conductive material of which said particles are composed being selected from the group consisting of carbon, graphite and mixtures thereof.

References Cited by the Examiner

UNITED STATES PATENTS

| | | | |
|---|---|---|---|
| 1,958,682 | 5/34 | Sprague | 317—230 |
| 2,556,830 | 6/51 | Thrune | 204—294 |
| 2,782,394 | 2/57 | Hardway | 317—231 X |
| 2,890,414 | 2/59 | Snavely | 317—231 X |
| 2,896,095 | 7/59 | Reed | 317—231 |
| 2,995,714 | 8/61 | Hannah | 317—231 |
| 3,021,482 | 2/62 | Estes | 317—231 |
| 3,054,030 | 9/62 | Evans | 317—230 |
| 3,116,635 | 1/64 | McQuitty | 317—231 |

FOREIGN PATENTS 216,762  2/58  Australia.

DAVID J. GALVIN, *Primary Examiner.*

SAMUEL BERSTEIN, *Examiner.*

UNITED STATES PATENT OFFICE
CERTIFICATE OF CORRECTION

Patent No. 3,214,647                                            October 26, 1965

Demetrios V. Louzos et al.

It is hereby certified that error appears in the above numbered patent requiring correction and that the said Letters Patent should read as corrected below.

Figure 3:
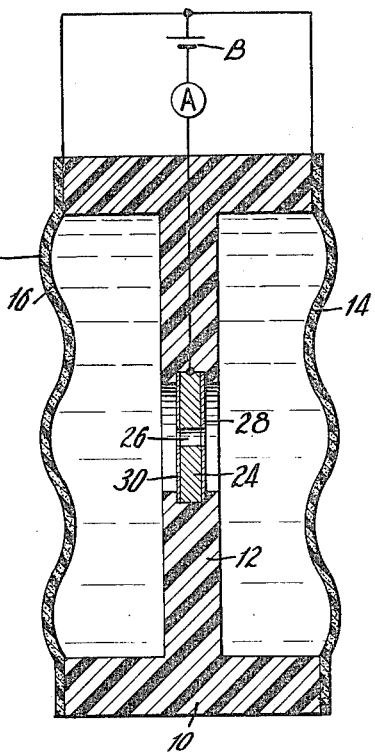
FIG. 3 is a view similar to FIG. 1 showing still another embodiment.

Column 3, line 23, for "FIGS. 4 and 5" read -- FIGS. 3 and 4 --; line 25, for "FIG. 4" read -- FIG. 3 --; line 30, for "FIG. 5" read -- FIG. 4 --; column 4, line 2, for "solution" read -- solion --.

Signed and sealed this 1st day of August 1967.

(SEAL)
Attest:

Edward M. Fletcher, Jr.                                     EDWARD J. BRENNER
Attesting Officer                                                Commissioner of Patents